US011295474B2

(12) United States Patent
Liu et al.

(10) Patent No.: US 11,295,474 B2
(45) Date of Patent: Apr. 5, 2022

(54) GAZE POINT DETERMINATION METHOD AND APPARATUS, ELECTRONIC DEVICE, AND COMPUTER STORAGE MEDIUM

(71) Applicant: BEIJING SENSETIME TECHNOLOGY DEVELOPMENT CO., LTD., Beijing (CN)

(72) Inventors: Tinghao Liu, Beijing (CN); Quan Wang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/729,424

(22) Filed: Dec. 29, 2019

(65) Prior Publication Data

US 2020/0134868 A1 Apr. 30, 2020

Related U.S. Application Data

(63) Continuation of application No. PCT/CN2018/117287, filed on Nov. 23, 2018.

(30) Foreign Application Priority Data

Sep. 28, 2018 (CN) .......................... 201811141352.3

(51) Int. Cl.
*G06T 7/70* (2017.01)
*G06F 3/01* (2006.01)
(Continued)

(52) U.S. Cl.
CPC ................ *G06T 7/75* (2017.01); *G06F 3/013* (2013.01); *G06K 9/0061* (2013.01);
(Continued)

(58) Field of Classification Search
CPC .......... G06T 7/75; G06T 17/00; G06F 3/013; G06K 9/00302; G06K 9/0061
(Continued)

(56) References Cited

U.S. PATENT DOCUMENTS

| 8,824,779 B1* | 9/2014 | Smyth ..................... G06T 7/593 382/154 |
| 2004/0174496 A1* | 9/2004 | Ji ............................. G06F 3/013 351/209 |

(Continued)

FOREIGN PATENT DOCUMENTS

| CN | 103870796 A | 6/2014 |
| CN | 104978548 A | 10/2015 |

(Continued)

OTHER PUBLICATIONS

International Search Report in the international application No. PCT/CN2018/117287, dated Jun. 28, 2019.

(Continued)

*Primary Examiner* — Hai Tao Sun
(74) *Attorney, Agent, or Firm* — Pattao, LLC; Junjie Feng

(57) ABSTRACT

A gaze point determination method and apparatus, an electronic device, and a computer storage medium are provided. The method includes: obtaining two-dimensional coordinates of eye feature points of at least one eye of a face in an image, the eye feature points including an eyeball center area feature point; obtaining, in the preset three-dimensional coordinate system, three-dimensional coordinate of a corresponding eyeball center area feature point in a three-dimensional face model corresponding to the face in the image based on the obtained two-dimensional coordinate of the eyeball center area feature point; and obtaining a determination result for a position of a gaze point of the eye of the face in the image according to two-dimensional coordinates of feature points other than the eyeball center area feature (Continued)

point in the eye feature points and the three-dimensional coordinate of the eyeball center area feature point in the preset three-dimensional coordinate system.

17 Claims, 8 Drawing Sheets

(51) Int. Cl.
   *G06T 17/00* (2006.01)
   *G06T 7/73* (2017.01)
   *G06K 9/00* (2022.01)

(52) U.S. Cl.
   CPC .......... *G06K 9/00302* (2013.01); *G06T 17/00* (2013.01); *G06T 2207/20084* (2013.01); *G06T 2207/30201* (2013.01)

(58) Field of Classification Search
   USPC ........................................................ 345/419
   See application file for complete search history.

(56) References Cited

U.S. PATENT DOCUMENTS

| | | | |
|---|---|---|---|
| 2010/0080418 A1 | 4/2010 | Ito | |
| 2012/0133640 A1* | 5/2012 | Chin | G06T 19/00 345/419 |
| 2013/0321265 A1* | 12/2013 | Bychkov | G06F 3/011 345/156 |
| 2015/0098654 A1* | 4/2015 | Kato | G06K 9/00617 382/190 |
| 2015/0187084 A1* | 7/2015 | Wang | G06T 7/12 345/628 |
| 2015/0294148 A1* | 10/2015 | Mohanakrishnan | A61B 3/113 382/103 |
| 2016/0202756 A1 | 7/2016 | Wu et al. | |
| 2018/0239426 A1 | 8/2018 | Yoshifuji | |

FOREIGN PATENT DOCUMENTS

| | | |
|---|---|---|
| CN | 105740846 A | 7/2016 |
| CN | 105989326 A | 10/2016 |
| CN | 106598221 A | 4/2017 |
| CN | 106843500 A | 6/2017 |
| CN | 107679447 A | 2/2018 |
| CN | 107679448 A | 2/2018 |
| JP | 2002288670 A | 10/2002 |
| JP | 2007181071 A | 7/2007 |
| JP | 2007265367 A | 10/2007 |
| JP | 2008194146 A | 8/2008 |
| JP | 2013252301 A | 12/2013 |
| JP | 2015201096 A | 11/2015 |
| JP | 2016157336 A | 9/2016 |
| JP | 2018101212 A | 6/2018 |
| JP | 2018528536 A | 9/2018 |
| KR | 20140003880 A | 1/2014 |
| KR | 20150117553 A | 10/2015 |
| TW | I471808 B | 2/2015 |
| TW | I476729 B | 3/2015 |

OTHER PUBLICATIONS

First Office Action of the Chinese application No. 201811141352.3, dated May 7, 2020.
First Office Action of the Korean application No. 10-2019-7038765, dated Nov. 30, 2020.
Hirotake Yamazoe, 3 outside members,"Automatic Calibration of 3D Eye Model for Signle-Camera Based Gaze Estimation", Transactions of the institute of electronics, Japan, Jun. 1, 2011, vol. J94-d, No. 6, pp. 998-1006.
First Office Action of the Japanese application No. 2019-570498, dated Jan. 5, 2021.

* cited by examiner

GAZE POINT DETERMINATION METHOD AND APPARATUS, ELECTRONIC DEVICE, AND COMPUTER STORAGE MEDIUM

CROSS-REFERENCE TO RELATED APPLICATIONS

The present application is a continuation of International Patent Application No. PCT/CN2018/117287 filed on Nov. 23, 2018, which claims priority to Chinese Patent Application No. 201811141352.3 filed on Sep. 28, 2018. The disclosures of these applications are hereby incorporated by reference in their entirety.

BACKGROUND

Face recognition is a new biometric recognition technology that has emerged in recent years with the rapid development of computer vision, pattern recognition, neural networks, artificial intelligence, and other technologies. Face recognition implements identification mainly based on geometric information, such as the position, shape and face contour of each face organ provided by face feature points. Therefore, in a face recognition process, the positioning of the face feature points is very important. At present, the positioning of the face feature points can achieve high precision by means of deep learning.

SUMMARY

The present disclosure relates to, but not limited to, the technical field of computers, and in particular, to gaze point determination methods and apparatuses, electronic devices, and computer storage media.

Embodiments of the present disclosure provide a technical solution for gaze point determination.

According to one aspect of embodiments of the present disclosure, a gaze point determination method is provided, including:

obtaining two-dimensional coordinates of eye feature points of at least one eye of a face in an image, where the eye feature points include an eyeball center area feature point;

obtaining, in a preset three-dimensional coordinate system, a three-dimensional coordinate of a corresponding eyeball center area feature point in a three-dimensional face model corresponding to the face in the image based on the obtained two-dimensional coordinate of the eyeball center area feature point; and obtaining a determination result for a position of a gaze point of an eye of the face in the image according to two-dimensional coordinates of feature points other than the eyeball center area feature point in the eye feature points and the three-dimensional coordinate of the eyeball center area feature point in the preset three-dimensional coordinate system.

According to another aspect of the embodiments of the present disclosure, a gaze point determination apparatus is provided, including:

an obtaining unit configured to obtain two-dimensional coordinates of eye feature points of at least one eye of a face in an image, where the eye feature points include an eyeball center area feature point; and obtain, in a preset three-dimensional coordinate system, three-dimensional coordinate of a corresponding eyeball center area feature point in a three-dimensional face model corresponding to the face in the image based on the obtained two-dimensional coordinate of the eyeball center area feature point; and a determination unit configured to obtain a determination result for the position of a gaze point of the eye of the face in the image according to two-dimensional coordinates of feature points other than the eyeball center area feature point in the eye feature points and the three-dimensional coordinate of the eyeball center area feature point in the preset three-dimensional coordinate system.

According to still another aspect of the embodiments of the present disclosure, an electronic device is provided, including the apparatus according to any one of the foregoing embodiments.

According to yet another aspect of the embodiments of the present disclosure, an electronic device is provided, including:

a memory for storing executable instructions; and a processor configured to communicate with the memory to execute the executable instructions to implement the method according to any one of the forgoing embodiments.

According to yet another aspect of the embodiments of the present disclosure, a computer program is provided, including computer readable codes that, when being executed in a device, causes a processor in the device to execute instructions for implementing the method according to any one of the foregoing embodiments.

According to yet another aspect of the embodiments of the present disclosure, a computer program product is provided, having stored therein computer readable instructions, that when being executed, causes a computer to execute operations of the method according to any one of the foregoing embodiments.

By means of the accompanying drawings and embodiments, the technical solutions of the present disclosure are further described below in details.

BRIEF DESCRIPTION OF DRAWINGS

The drawings constituting a part of the description describe embodiments of the present disclosure, and are used for explaining the principles of the present disclosure in combination of the description.

With reference to the accompanying drawings, according to the detailed description below, the present disclosure can be understood more clearly, where.

DETAILED DESCRIPTION

Figure 1:
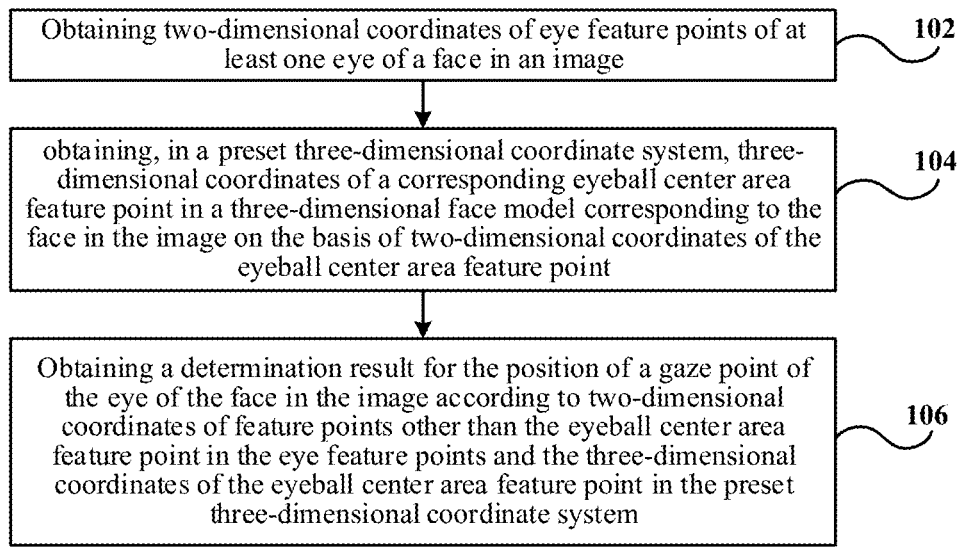
FIG. 1 is a flowchart of a gaze point determination method according to some embodiments of the present disclosure.

Exemplary embodiments of the present disclosure are described in detail with reference to the accompany drawings now. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each section shown in the accompanying drawings is not drawn in an actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the description in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of a gaze point determination method according to some embodiments of the present disclosure. The method is executed by a server or a terminal device, for example, the terminal device includes a mobile phone, a computer, a vehicle-mounted device, and the like. As shown in FIG. 1, the method includes the following operations.

In operation 102, two-dimensional coordinates of eye feature points of at least one eye of a face in an image are obtained.

In embodiments of the present disclosure, an image for gaze point determination is obtained from an image acquisition device, or is obtained from a storage device. For example, the image acquisition device includes: a video camera, a still camera, a scanner, and the like, and the storage device includes: a hard disk, an optical disk, a floppy disk, and the like. The approach of obtaining the image for gaze point determination is not limited in the embodiments of the present disclosure. The eye feature points include an eyeball center area feature point. In some embodiments, the eye feature points further include: an eyelid line feature point and an eyeball contour feature point, which is not limited in the embodiments of the present disclosure.

In one example, since two eyes of a person generally gaze at the same direction at the same time, gaze points of the two eyes of a face in an image can be determined by obtaining two-dimensional coordinates of the eye feature points of one eye of the face in the image. In another example, gaze points of two eyes of a face in an image can be determined by obtaining two-dimensional coordinates of the eye feature points of two eyes of the face in the image.

In some embodiments, features are extracted from the image to obtain two-dimensional coordinates of face feature points in the image, and then the two-dimensional coordinates of the eye feature points of at least one eye of the face in the image are obtained on the basis of the two-dimensional coordinates of the face feature points in the image. For example, features are extracted from an image to obtain two-dimensional coordinates of 106 feature points of a face in the image, and then two-dimensional coordinates of eye feature points of at least one eye of the face in the image are obtained on the basis of the two-dimensional coordinates of the 106 feature points.

In some embodiments, one or more rectangular images including an eye area corresponding to the at least one eye is intercepted from the image according to two-dimensional coordinates of feature points of the eye area of the face in the image, and then features are extracted from the rectangular image to obtain two-dimensional coordinates of the eye feature points of at least one eye of the face in the image.

In one example, a rectangular image including an eye area corresponding to one eye is intercepted from the image according to two-dimensional coordinates of feature points of the eye area of one eye of the face in the image, and then features are extracted from the rectangular image to obtain two-dimensional coordinates of the eye feature points of one eye of the face in the image.

In another example, a rectangular image including a corresponding eye area is intercepted from the image according to two-dimensional coordinates of feature points of the eye area of one eye of the face in the image, and then the rectangular image is mirrored and features are extracted from the rectangular image and the mirrored rectangular image to obtain two-dimensional coordinates of the eye feature points of two eyes of the face in the image.

In some embodiments, features are extracted from the image by means of a neural network or other machine learning methods. In one example, the neural network uses a convolutional neural network. The method for extracting features from the image is not limited in the embodiments of the present disclosure.

In operation 104, three-dimensional coordinates of a corresponding eyeball center area feature point, in a preset three-dimensional coordinate system, in a three-dimensional face model corresponding to the face in the image are obtained on the basis of two-dimensional coordinates of the eyeball center area feature point.

In some embodiments, the corresponding three-dimensional face model is generated according to the face in the image, and then the three-dimensional coordinates of the corresponding eyeball center area feature point, in a preset three-dimensional coordinate system, in the three-dimensional face model are obtained on the basis of the two-dimensional coordinates of the eyeball center area feature point. In some embodiments, keypoints of the face in the image can be preset, and the three-dimensional face model corresponding to the face is generated according to a correspondence between the keypoints of the face in the image and keypoints of a prior three-dimensional face model. For example, multiple keypoints include a face contour keypoint, an eye keypoint, an eyebrow keypoint, a lip keypoint, a nose keypoint, and the like. The type and number of the keypoints is not limited in the embodiments of the present disclosure.

In some embodiments, the preset three-dimensional coordinate system can be determined according to a preset principle. For example, the origin of a three-dimensional coordinate system is a center point of a front camera of a mobile phone, the X-axis positive direction of the three-dimensional coordinate system is a horizontal direction from the origin to the left along the front camera of the mobile phone, the Y-axis positive direction of the three-dimensional coordinate system is a vertical direction from the origin to the upward along the front camera of the mobile phone, and the Z-axis positive direction of the three-dimensional coordinate system is a direction perpendicular to the front camera of the mobile phone and extending from the origin to the outside of the front camera of the mobile phone.

In operation 106, a determination result for the position of a gaze point of the eye of the face in the image is obtained according to two-dimensional coordinates of feature points other than the eyeball center area feature point in the eye feature points and the three-dimensional coordinates of the eyeball center area feature point in the preset three-dimensional coordinate system.

In some embodiments, a gaze fraction of the eye of the face in the image is obtained according to the two-dimensional coordinates of the feature points other than the eyeball center area feature point in the eye feature points and the three-dimensional coordinates of the eyeball center area feature point in the preset three-dimensional coordinate system, and then the gaze fraction is compared with a preset threshold to obtain the determination result for the position of the gaze point of the eye of the face in the image. In some embodiments, the gaze fraction of the eye of the face in the image is obtained by means of the neural network or other machine learning methods according to the two-dimensional coordinates of the feature points other than the eyeball center area feature point in the eye feature points and the three-dimensional coordinates of the eyeball center area feature point in the preset three-dimensional coordinate system. In one example, the neural network uses a simple network structure consisting of a full-connection layer and a ReLU layer. The method for obtaining the gaze fraction of the eye of the face in the image is not limited in the embodiments of the present disclosure.

In some embodiments, after the three-dimensional coordinates of the corresponding eyeball center area feature point, in a preset three-dimensional coordinate system, in the three-dimensional face model corresponding to the face in the image are obtained on the basis of the two-dimensional coordinates of the eyeball center area feature point, formats of the two-dimensional coordinates of the feature points other than the eyeball center area feature point in the eye feature points and the three-dimensional coordinates of the eyeball center area feature point in the preset three-dimensional coordinate system are adjusted according to a preset format, so that the gaze fraction of the eye of the face in the image is obtained by means of the neural network according to the two-dimensional coordinates of the feature points other than the eyeball center area feature point in the eye feature points and the three-dimensional coordinates of the eyeball center area feature point in the preset three-dimensional coordinate system which are subjected to format adjustment. In one example, format adjustment indicates adjustment to a date order, i.e., orders of the two-dimensional coordinates of the feature points other than the eyeball center area feature point in the eye feature points and the three-dimensional coordinates of the eyeball center area feature point in the preset three-dimensional coordinate system are adjusted so as to keep consistent with a data order when the neural network is trained.

In some embodiments, the determination result includes: the gaze point of the eye of the face in the image is within a preset area, and the gaze point of the eye of the face in the image is out of the preset area. The gaze fraction is compared with the preset threshold, where if the gaze fraction is greater than the preset threshold, the determination result that the gaze point of the eye of the face in the image is within the preset area can be obtained, and if the gaze fraction is less than or equal to the preset threshold, the determination result that the gaze point of the eye of the face in the image is out of the preset area can be obtained. In one example, the preset area includes: part or all of a screen area, i.e., the embodiments of the present disclosure can be used for determining whether the gaze point of the eye of the face in the image is within the screen area, or for determining whether the gaze point of the eye of the face in the image is within a specific area of a screen.

In some embodiments, the preset threshold includes: a difference between a true positive rate and a false positive rate, where the true positive rate includes: a rate of correct determination when the gaze point of the eye of the face in the image is within the preset area, and the false positive rate includes: a rate of incorrect determination when the gaze point of the eye of the face in the image is out of the preset area.

Figure 2A:
FIGS. 2A and 2B are schematic diagrams of one application embodiment of a gaze point determination method of the present disclosure.
Figure 2B:

In some embodiments, after the gaze fraction is compared with the preset threshold to obtain the determination result for the position of the gaze point of the eye of the face in the image, corresponding processing can be performed on the image according to the determination result. In one example, the image is displayed according to a first preset display mode in response to that the gaze point of the eye of the face in the image is within the preset area, and the image is displayed according to a second preset display mode in response to that the gaze point of the eye of the face in the image is out of the preset area. In one example, the first preset display mode and the second preset display mode respectively indicate setting frames of different colors for the displayed image. For example, as shown in FIGS. 2A and 2B, a red frame is set for the displayed image in response to that the gaze point of the eye of the face in the image is within the preset area, and a blue frame is set for the displayed image in response to that the gaze point of the eye of the face in the image is out of the preset area.

In some embodiments, the method according to the embodiments of the preset disclosure can be used for recognizing a facial expression of the face in the image, and can also be used for determining, by determining the position of the gaze point of the eye of the face in the image, whether a person in the image is aware of a current situation, so as to be used in terminal payment, terminal locking, and terminal unlocking to ensure the security of payment, locking and unlocking.

In some embodiments of the present disclosure, the operations S102 to S106 may be executed by a processor by invoking a corresponding instruction stored in a memory, or executed by corresponding module run by the processor.

On the basis of gaze point determination methods provided in the foregoing embodiments of the present disclosure, two-dimensional coordinates of eye feature points of at least one eye of a face in an image are obtained, where the eye feature points include an eyeball center area feature point; three-dimensional coordinates of a corresponding eyeball center area feature point, in a preset three-dimensional coordinate system, in a three-dimensional face model corresponding to the face in the image are obtained on the basis of two-dimensional coordinates of the eyeball center area feature point; and a determination result for the position of a gaze point of the eye of the face in the image is obtained according to two-dimensional coordinates of feature points other than the eyeball center area feature point in the eye feature points and the three-dimensional coordinates of the eyeball center area feature point in the preset three-dimensional coordinate system. An eye state can be determined more accurately by learning fine information around an eye of a face in an image, so that more accurate eye state information can be obtained.

In the foregoing embodiments, when the determination result for the position of the gaze point of the eye of the face in the image is obtained by means of the neural network according to the two-dimensional coordinates of the feature points other than the eyeball center area feature point in the eye feature points and the three-dimensional coordinates of the eyeball center area feature point in the preset three-dimensional coordinate system, since the neural network used is not a conventional neural network, the neural network needs to be trained first, and since the input of the neural network is not a conventional image but coordinates of eye feature points of the face in the image, the coordinates of the eye feature points of the face in the image needs to be obtained from a preset data set before the neural network is trained according to the image in the preset data set.

A flow of obtaining coordinates of eye feature points of a face in each image in a preset data set according to the preset data set and a flow of training a neural network according to coordinates of eye feature points of a face in each image in a preset data set are described in detail as follows in combination with embodiments of FIGS. 3 and 4.

Figure 3:
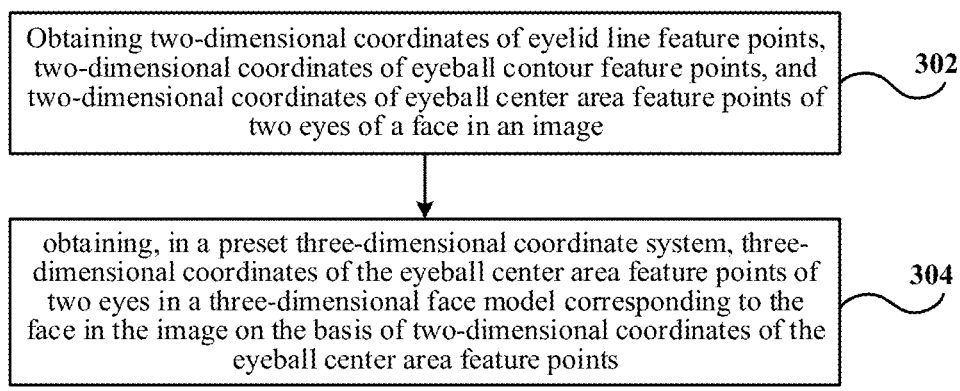
FIG. 3 is a flowchart of obtaining coordinates of eye feature points of a face in each image in a preset data set according to the preset data set according to embodiments of the present disclosure.
Figure 4:
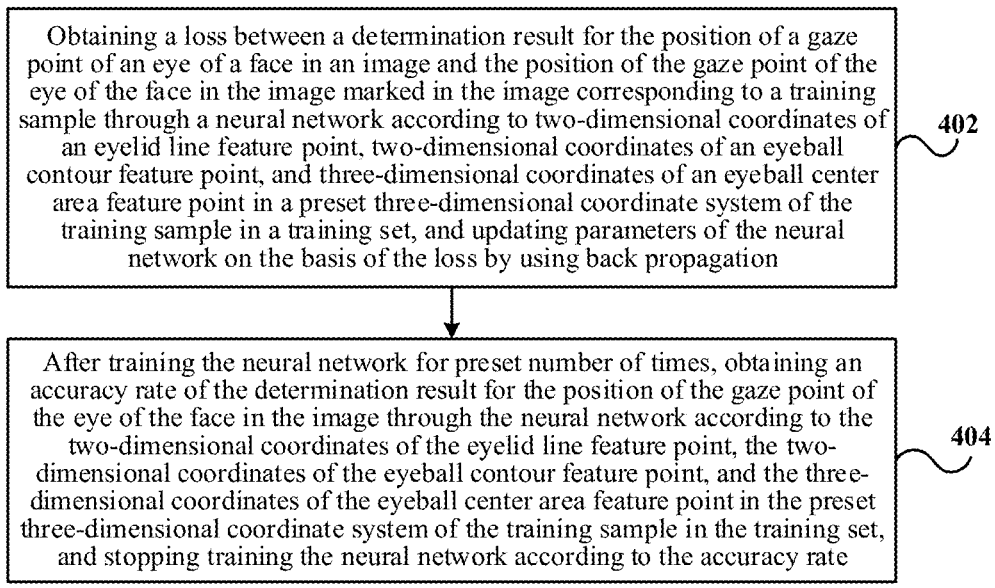
FIG. 4 is a flowchart of training a neural network according to coordinates of eye feature points of a face in each image in a preset data set according to embodiments of the present disclosure.

It should be understood that the examples shown in FIGS. 3 and 4 are merely intended to help a person of ordinary skill in the art better understand the technical solution of the present disclosure, but should not be understood to limit the present disclosure. A person of ordinary skill in the art can make various transformations on the basis of FIGS. 3 and 4; however, such transformations should also be understood to be a part of the technical solution of the present disclosure.

As shown in FIG. 3, the method includes the following operations.

In operation 302, two-dimensional coordinates of eyelid line feature points, two-dimensional coordinates of eyeball contour feature points, and two-dimensional coordinates of eyeball center area feature points of two eyes of a face in an image are obtained.

In the embodiments of the present disclosure, the image is obtained from the preset data set, and each image in the preset data set is marked with the position of a gaze point of an eye of the face in the image, where an existing face recognition data set can be used as the preset data set, which is not limited in the embodiments of the present disclosure.

In some embodiments, features are extracted from the image to obtain two-dimensional coordinates of face feature points in the image, then a rectangular image including a corresponding eye area is intercepted from the image according to two-dimensional coordinates of feature points of the eye area of one eye of the face in the image, the rectangular image is mirrored, and features are extracted from the rectangular image and the mirrored rectangular image to obtain the two-dimensional coordinates of the eyelid line feature points, the two-dimensional coordinates of the eyeball contour feature points, and the two-dimensional coordinates of the eyeball center area feature points of two eyes of the face in the image.

In some embodiments, features are extracted from the image by means of a neural network or other machine learning methods. In one example, the neural network uses a convolutional neural network. The method for extracting features from the image is not limited in the embodiments of the present disclosure. For example, features are extracted from the image by means of the neural network to obtain two-dimensional coordinates of 106 feature points of the face in the image.

In operation 304, three-dimensional coordinates of the eyeball center area feature points of two eyes in a three-dimensional face model corresponding to the face in the image in a preset three-dimensional coordinate system are obtained on the basis of the two-dimensional coordinates of the eyeball center area feature points.

In some embodiments, the corresponding three-dimensional face model is generated according to the face in the image, and then the three-dimensional coordinates of the corresponding eyeball center area feature points, in the preset three-dimensional coordinate system, in the three-dimensional face model are obtained on the basis of the two-dimensional coordinates of the eyeball center area feature points. In some embodiments, keypoints of the face in the image can be preset, and the three-dimensional face model corresponding to the face is generated according to a correspondence between the keypoints of the face in the image and keypoints of a prior three-dimensional face model. For example, multiple keypoints include a face contour keypoint, an eye keypoint, an eyebrow keypoint, a lip keypoint, a nose keypoint, and the like. The type and number of the keypoints is not limited in the embodiments of the present disclosure.

In some embodiments, after the three-dimensional coordinates of the eyeball center area feature points of two eyes in the three-dimensional face model corresponding to the face in the image in the preset three-dimensional coordinate system are obtained on the basis of the two-dimensional coordinates of the eyeball center area feature points, the two-dimensional coordinates of the eyelid line feature points, the two-dimensional coordinates of the eyeball contour feature points, and the three-dimensional coordinates of the eyeball center area feature points in the preset three-dimensional coordinate system can be stored in a file according to a preset format. In one example, the preset format is an order of the two-dimensional coordinates of the eyelid line feature points, the two-dimensional coordinates of the eyeball contour feature points, and the three-dimensional coordinates of the eyeball center area feature points in the preset three-dimensional coordinate system.

In some embodiments, when the two-dimensional coordinates of the eyelid line feature points, the two-dimensional coordinates of the eyeball contour feature points, and the three-dimensional coordinates of the eyeball center area feature points in the preset three-dimensional coordinate system are stored in the file, the coordinates of the eye feature points of the face in each mage in the preset data set can be classified as a testing set and a training set to be respectively used for testing and training the neural network.

In some embodiments of the present disclosure, the operations S302 and S304 may be executed by a processor by invoking a corresponding instruction stored in a memory, or executed by corresponding module run by the processor.

As shown in FIG. 4, the method includes the following operations.

In operation 402, a loss between a determination result for the position of a gaze point of an eye of a face in an image and the position of the gaze point of the eye of the face in the image marked in the image corresponding to a training sample is obtained by means of a neural network according to two-dimensional coordinates of an eyelid line feature point, two-dimensional coordinates of an eyeball contour feature point, and three-dimensional coordinates of an eyeball center area feature point in a preset three-dimensional coordinate system of the training sample in a training set, and parameters of the neural network are updated on the basis of the loss by means of back propagation.

In the embodiments of the present disclosure, a training sample in the training set can be obtained according to an image in a preset data set, where each training sample in the training set consists of the two-dimensional coordinates of the eyelid line feature point, the two-dimensional coordinates of the eyeball contour feature point, and the three-dimensional coordinates of the eyeball center area feature point in the preset three-dimensional coordinate system, each image in the preset data set is marked with the position of the gaze point of the eye of the face in the image, and an existing face recognition data set can be used as the preset data set, which is not limited in the embodiments of the present disclosure. In one example, the neural network uses a simple network structure consisting of a full-connection layer and a ReLU layer. In some embodiments, the neural network is trained with a gradient descent or other neural network training methods, which is not limited in the embodiments of the present disclosure.

In operation 404, after training the neural network for preset number of times, an accuracy rate of the determination result for the position of the gaze point of the eye of the face in the image is obtained by means of the neural network according to the two-dimensional coordinates of the eyelid line feature point, the two-dimensional coordinates of the eyeball contour feature point, and the three-dimensional coordinates of the eyeball center area feature point in the preset three-dimensional coordinate system of the training sample in the training set, and the neural network is stopped from being trained according to the accuracy rate.

In the embodiments of the present disclosure, a training sample in the training set can be obtained according to an image in a preset data set, where each training sample in the training set consists of the two-dimensional coordinates of the eyelid line feature point, the two-dimensional coordinates of the eyeball contour feature point, and the three-dimensional coordinates of the eyeball center area feature point in the preset three-dimensional coordinate system, each image in the preset data set is marked with the position of the gaze point of the eye of the face in the image, and the testing set and the training set can be obtained according to the same preset data set, and can also be obtained according to different preset data sets, which is not limited in the embodiments of the present disclosure; and an existing face recognition data set can be used as the preset data set, which is not limited in the embodiments of the present disclosure.

In some embodiments, since the task of the neural network is simple, it is prone to cause an over-fitting phenomenon, such that when the loss obtained by means of the training set does not change and the accuracy rate obtained by means of the testing set begins to rise, the training of the network can be terminated in advance.

In the foregoing embodiments, after the neural network is trained, a preset threshold of determining the position of the gaze point of the eye of the face in the image can be determined according to the testing set.

A gaze fraction of an image corresponding to each testing sample by the neural network can be obtained by inputting the testing sample into the neural network; then each gaze fraction is compared with a mark of the corresponding image, where if the gaze fraction is greater than a current threshold, it is determined to be gazing at a preset area, and if the gaze fraction is less than or equal to the current threshold, it is determined to be not gazing at the preset area; and True_positive is used for representing that the fraction is greater than the current threshold and the mark is positive (gazing), False negative is used for representing that the fraction is less than or equal to the current threshold and the mark is positive (gazing), False_positive is used for representing that the fraction is greater than the current threshold and the mark is negative (not gazing), and True negative is used for representing that the fraction is less than or equal to the current threshold and the mark is negative (not gazing), so as to record the result of each testing sample, and a True positive rate (Tpr) and a False positive rate (Fpr) are obtained according to the recorded results, where Tpr is equal to True_positive/(True_positive+False_negative) and represents a rate of correct determination when the eye of the face in the image gazes at the preset area, Fpr is equal to False_positive/(True_negative+False_positive) and represents a rate of incorrect determination when the eye of the face in the image does not gaze at the preset area, a maximum difference Mx between Tpr and Fpr is used as the preset threshold, and a total accuracy rate is stored.

In some embodiments, the true positive rate can be called as a first rate, and the false positive rate can be called as a second rate. The "true positive" and "false positive" are merely titles for distinguishing the two rates.

In some embodiments of the present disclosure, the operations S402 and S404 may be executed by a processor by invoking a corresponding instruction stored in a memory, or executed by corresponding module run by the processor.

Figure 5:
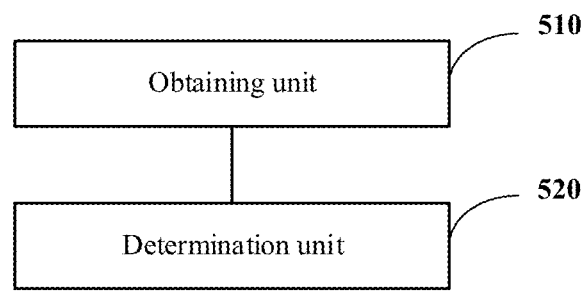
FIG. 5 is a schematic structural diagram of a gaze point determination apparatus according to some embodiments of the present disclosure.

FIG. 5 is a schematic structural diagram of a gaze point determination apparatus according to some embodiments of the present disclosure. The apparatus is provided on a server or a terminal device to be executed. For example, the terminal device includes a mobile phone, a computer, a vehicle-mounted device, and the like. As shown in FIG. 5, the apparatus includes: an obtaining unit 510 and a determination unit 520.

The obtaining unit 510 is configured to obtain two-dimensional coordinates of eye feature points of at least one eye of a face in an image.

In embodiments of the present disclosure, an image for gaze point determination is obtained from an image acquisition device, or is obtained from a storage device. For example, the image acquisition device includes: a video camera, a still camera, a scanner, and the like, and the storage device includes: a hard disk, an optical disk, a floppy disk, and the like. The approach of obtaining the image for gaze point determination is not limited in the embodiments of the present disclosure. The eye feature points include an eyeball center area feature point. In some embodiments, the eye feature points further include: an eyelid line feature point and an eyeball contour feature point, which is not limited in the embodiments of the present disclosure.

In one example, since two eyes of a person generally gaze at the same direction at the same time, the obtaining unit 510 can determine gaze points of the two eyes of a face in an image by obtaining two-dimensional coordinates of the eye feature points of one eye of the face in the image. In another example, the obtaining unit 510 can determine gaze points of two eyes of a face in an image by obtaining two-dimensional coordinates of the eye feature points of two eyes of the face in the image.

In some embodiments, the obtaining unit 510 can extract features from the image to obtain two-dimensional coordinates of face feature points in the image, and then obtain the two-dimensional coordinates of the eye feature points of at least one eye of the face in the image on the basis of the two-dimensional coordinates of the face feature points in the image. For example, the obtaining unit 510 can extract features from an image to obtain two-dimensional coordinates of 106 feature points of a face in the image, and then obtain two-dimensional coordinates of eye feature points of at least one eye of the face in the image on the basis of the two-dimensional coordinates of the 106 feature points.

Figure 6:
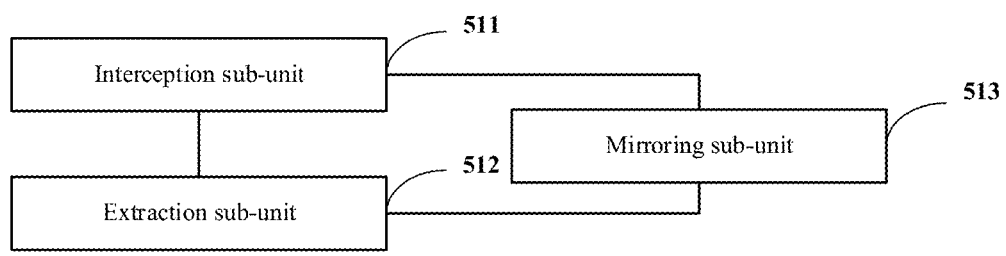
FIG. 6 is a schematic structural diagram of an obtaining unit in a gaze point determination apparatus according to some embodiments of the present disclosure.

In some embodiments, as shown in FIG. 6, the obtaining unit 510 includes: an interception sub-unit 511 and an extraction sub-unit 512, where the interception sub-unit 511 can intercept a rectangular image including a corresponding eye area from the image according to two-dimensional coordinates of feature points of the eye area of the face in the image, and the extraction sub-unit 512 can extract features from the rectangular image to obtain two-dimensional coordinates of the eye feature points of at least one eye of the face in the image.

In one example, the interception sub-unit 511 can intercept a rectangular image including a corresponding eye area from the image according to two-dimensional coordinates of feature points of the eye area of one eye of the face in the image, and the extraction sub-unit 512 can extract features from the rectangular image to obtain two-dimensional coordinates of the eye feature points of one eye of the face in the image.

In another example, the obtaining unit 510 further includes: a mirroring sub-unit 513. The interception sub-unit 511 can intercept a rectangular image including a corresponding eye area from the image according to two-dimensional coordinates of feature points of the eye area of one eye of the face in the image; the mirroring sub-unit 513 can mirror the rectangular image; and the extraction sub-unit 512 can extract features from the rectangular image and the mirrored rectangular image to obtain two-dimensional coordinates of the eye feature points of two eyes of the face in the image.

In some embodiments, features are extracted from the image by means of a neural network or other machine learning methods. In one example, the neural network uses a convolutional neural network. The method for extracting features from the image is not limited in the embodiments of the present disclosure.

The obtaining unit 510 is further configured to obtain, in a preset three-dimensional coordinate system, three-dimensional coordinates of a corresponding eyeball center area feature point in a three-dimensional face model corresponding to the face in the image on the basis of two-dimensional coordinates of the eyeball center area feature point.

In some embodiments, the obtaining unit 510 can generate the corresponding three-dimensional face model according to the face in the image, and then obtain, in a preset three-dimensional coordinate system, the three-dimensional coordinates of the corresponding eyeball center area feature point in the three-dimensional face model on the basis of the two-dimensional coordinates of the eyeball center area feature point. In some embodiments, keypoints of the face in the image can be preset, and the obtaining unit 510 generates the three-dimensional face model corresponding to the face according to a correspondence between the keypoints of the face in the image and keypoints of a prior three-dimensional face model. For example, multiple keypoints include a face contour keypoint, an eye keypoint, an eyebrow keypoint, a lip keypoint, a nose keypoint, and the like. The type and number of the keypoints is not limited in the embodiments of the present disclosure.

In some embodiments, the preset three-dimensional coordinate system can be determined according to a preset principle. For example, the origin of a three-dimensional coordinate system is a center point of a front camera of a mobile phone, the X-axis positive direction of the three-dimensional coordinate system is a horizontal direction from the origin to the left along the front camera of the mobile phone, the Y-axis positive direction of the three-dimensional coordinate system is a vertical direction from the origin to the upward along the front camera of the mobile phone, and the Z-axis positive direction of the three-dimensional coordinate system is a direction perpendicular to the front camera of the mobile phone and extending from the origin to the outside of the front camera of the mobile phone.

The determination unit 520 is configured to obtain a determination result for the position of a gaze point of the eye of the face in the image according to two-dimensional coordinates of feature points other than the eyeball center area feature point in the eye feature points and the three-dimensional coordinates of the eyeball center area feature point in the preset three-dimensional coordinate system.

In some embodiments, the determination unit 520 can obtain a gaze fraction of the eye of the face in the image according to the two-dimensional coordinates of the feature points other than the eyeball center area feature point in the eye feature points and the three-dimensional coordinates of the eyeball center area feature point in the preset three-dimensional coordinate system, and then compare the gaze fraction with a preset threshold to obtain the determination result for the position of the gaze point of the eye of the face in the image. In some embodiments, the determination unit 520 can obtain the gaze fraction of the eye of the face in the image by means of the neural network or other machine learning methods according to the two-dimensional coordinates of the feature points other than the eyeball center area feature point in the eye feature points and the three-dimensional coordinates of the eyeball center area feature point in the preset three-dimensional coordinate system. In one example, the neural network uses a simple network structure consisting of a full-connection layer and a ReLU layer. The method for obtaining the gaze fraction of the eye of the face in the image is not limited in the embodiments of the present disclosure.

In some embodiments, the apparatus further includes an adjustment unit. After the obtaining unit 510 obtains, in the preset three-dimensional coordinate system, the three-dimensional coordinates of the corresponding eyeball center area feature point in the three-dimensional face model corresponding to the face in the image on the basis of the two-dimensional coordinates of the eyeball center area feature point, the adjustment unit can adjust formats of the two-dimensional coordinates of the feature points other than the eyeball center area feature point in the eye feature points and the three-dimensional coordinates of the eyeball center area feature point in the preset three-dimensional coordinate system according to a preset format, so that the determination unit 520 can obtain the gaze fraction of the eye of the face in the image by means of the neural network according to the two-dimensional coordinates of the feature points other than the eyeball center area feature point in the eye feature points and the three-dimensional coordinates of the eyeball center area feature point in the preset three-dimensional coordinate system which are subjected to format adjustment. In one example, format adjustment indicates adjustment to a date order, i.e., orders of the two-dimensional coordinates of the feature points other than the eyeball center area feature point in the eye feature points and the three-dimensional coordinates of the eyeball center area feature point in the preset three-dimensional coordinate system are adjusted so as to keep consistent with a data order when the neural network is trained.

In some embodiments, the determination result includes: the gaze point of the eye of the face in the image is within a preset area, and the gaze point of the eye of the face in the image is out of the preset area. The determination unit 520 compares the gaze fraction with the preset threshold, where if the gaze fraction is greater than the preset threshold, the determination result that the gaze point of the eye of the face in the image is within the preset area can be obtained, and if the gaze fraction is less than or equal to the preset threshold, the determination result that the gaze point of the eye of the face in the image is out of the preset area can be obtained. In one example, the preset area includes: part or all of a screen area, i.e., the embodiments of the present disclosure can be used for determining whether the gaze point of the eye of the face in the image is within the screen area, or for determining whether the gaze point of the eye of the face in the image is within a specific area of a screen.

In some embodiments, the preset threshold includes: a difference between a true positive rate and a false positive rate, where the true positive rate includes: a rate of correct determination when the gaze point of the eye of the face in the image is within the preset area, and the false positive rate includes: a rate of incorrect determination when the gaze point of the eye of the face in the image is out of the preset area.

In some embodiments, the apparatus further includes: a processing unit. After comparing the gaze fraction with the preset threshold to obtain the determination result for the position of the gaze point of the eye of the face in the image, the processing unit can perform corresponding processing on the image according to the determination result. In one example, the processing unit can display the image according to a first preset display mode in response to that the gaze point of the eye of the face in the image is within the preset area, and display the image according to a second preset display mode in response to that the gaze point of the eye of the face in the image is out of the preset area. In one example, the first preset display mode and the second preset display mode respectively indicate setting frames of different colors for the displayed image. For example, as shown in FIGS. 2A and 2B, the processing unit sets a red frame for the displayed image in response to that the gaze point of the eye of the face in the image is within the preset area, and sets a blue frame for the displayed image in response to that the gaze point of the eye of the face in the image is out of the preset area.

In some embodiments, the apparatus according to the embodiments of the preset disclosure can be used for recognizing a facial expression of the face in the image, and can also be used for determining, by determining the position of the gaze point of the eye of the face in the image, whether a person in the image is aware of a current situation, so as to be used in terminal payment, terminal locking, and terminal unlocking to ensure the security of payment, locking and unlocking.

On the basis of gaze point determination apparatuses provided in the foregoing embodiments of the present disclosure, two-dimensional coordinates of eye feature points of at least one eye of a face in an image are obtained, where the eye feature points include an eyeball center area feature point; three-dimensional coordinates of a corresponding eyeball center area feature point, in the preset three-dimensional coordinate system, in a three-dimensional face model corresponding to the face in the image are obtained on the basis of two-dimensional coordinates of the eyeball center area feature point; and a determination result for the position of a gaze point of the eye of the face in the image is obtained according to two-dimensional coordinates of feature points other than the eyeball center area feature point in the eye feature points and the three-dimensional coordinates of the eyeball center area feature point in the preset three-dimensional coordinate system. An eye state can be determined more accurately by learning fine information around an eye of a face in an image, so that more accurate eye state information can be obtained.

Figure 7:
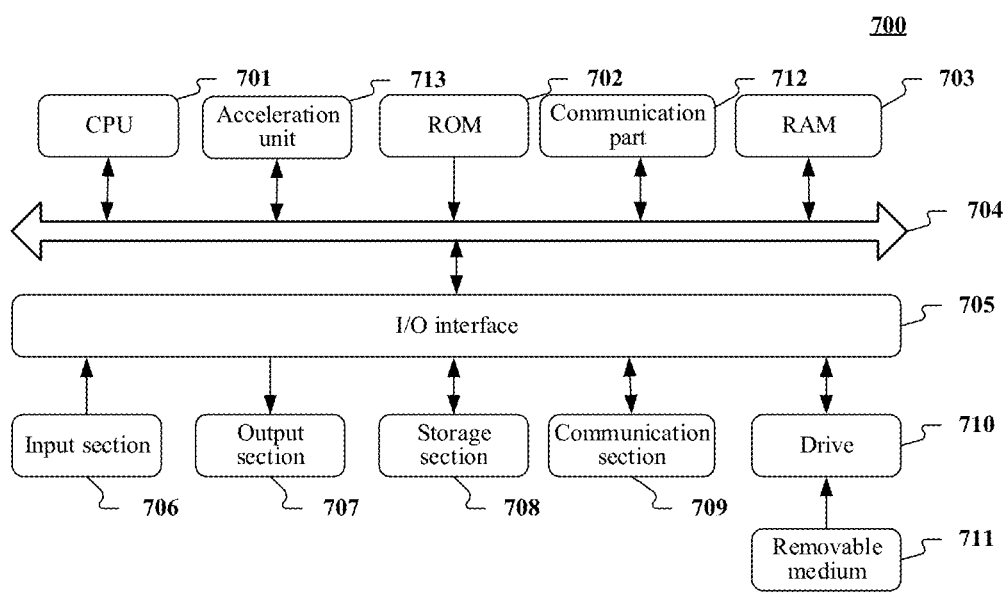
FIG. 7 is a schematic structural diagram of an electronic device according to some embodiments of the present disclosure.

Embodiments of the present disclosure further provide an electronic device which, for example, may be a mobile terminal, a Personal Computer (PC), a tablet computer, a server, and the like. Referring to FIG. 7 below, a schematic structural diagram of an electronic device 700, which may be a terminal device or a server, suitable for implementing the embodiments of the present application is shown. As shown in FIG. 7, the electronic device 700 includes one or more processors, a communication part, and the like. The one or more processors are, for example, one or more Central Processing Units (CPUs) 701, and/or one or more acceleration units 713 or the like. The acceleration units 713 may include but is not limited to GPU, FPGA, and other types of special purpose processors or the like. The processors may execute appropriate actions and processing according to executable instructions stored in a Read-Only Memory (ROM) 702 or executable instructions loaded from a storage section 708 to a Random Access Memory (RAM) 703. The communication part 712 may include, but is not limited to, a network card. The network card may include, but is not limited to, an Infiniband (IB) network card. The processor may communicate with the ROM 702 and/or the RAM 703 to execute executable instructions, be connected to the communication part 712 via a bus 704, and communicate with other target devices via the communication part 712, thereby implementing corresponding operations of any method provided in the embodiment of the present application. For example, two-dimensional coordinates of eye feature points of at least one eye of a face in an image are obtained, where the eye feature points include an eyeball center area feature point; three-dimensional coordinates of a corresponding eyeball center area feature point, in the preset three-dimensional coordinate system, in a three-dimensional face model corresponding to the face in the image are obtained on the basis of two-dimensional coordinates of the eyeball center area feature point; and a determination result for the position of a gaze point of the eye of the face in the image is obtained according to two-dimensional coordinates of feature points other than the eyeball center area feature point in the eye feature points and the three-dimensional coordinates of the eyeball center area feature point in the preset three-dimensional coordinate system.

In addition, the RAM 703 further stores various programs and data required for operations of an apparatus. The CPU 701, the ROM 702, and the RAM 703 are connected to each other via the bus 704. In the presence of the RAM 703, the ROM 702 is an optional module. The RAM 703 stores executable instructions, or writes the executable instructions into the ROM 702 during running, where the executable instructions cause the CPU 701 to execute corresponding operations of the foregoing communication method. An Input/Output (I/O) interface 705 is also connected to the bus 704. The communication part 712 is integrated, or is configured to have multiple sub-modules (for example, multiple IB network cards) connected to the bus.

The following components are connected to the I/O interface 705: an input section 706 including a keyboard, a mouse and the like; an output section 707 including a Cathode-Ray Tube (CRT), a Liquid Crystal Display (LCD), a speaker and the like; a storage section 708 including a hard disk and the like; and a communication section 709 of a network interface card including an LAN card, a modem and the like. The communication section 709 performs communication processing via a network such as the Internet. A drive 710 is also connected to the I/O interface 705 according to requirements. A removable medium 711 such as a magnetic disk, an optical disk, a magneto-optical disk, a semiconductor memory or the like is mounted on the drive 710 according to requirements, so that a computer program read from the removable medium is installed on the storage section 708 according to requirements.

It should be noted that, the architecture shown in FIG. 7 is merely an optional implementation. During specific practice, the number and types of the components in FIG. 7 may be selected, decreased, increased, or replaced according to actual requirements. Different functional components may be separated or integrated or the like. For example, the acceleration unit 713 and the CPU 701 may be separated, or the acceleration unit 713 may be integrated on the CPU 701, and the communication part 712 may be separated from or integrated on the CPU 701 or the acceleration unit 713 or the like. These alternative implementations all fall within the scope of protection of this disclosure.

In some embodiments, a process described above with reference to a flowchart according to the embodiments of the present disclosure may be implemented as a computer software program. For example, the embodiments of the present disclosure include a computer program product. The computer program product includes a computer program tangibly included in a machine-readable medium. The computer program includes a program code for performing a method shown in the flowchart. The program code may include instructions for performing steps of the method provided in the embodiments of the present application. For example, two-dimensional coordinates of eye feature points of at least one eye of a face in an image are obtained, where the eye feature points include an eyeball center area feature point; three-dimensional coordinates of a corresponding eyeball center area feature point, in the preset three-dimensional coordinate system, in a three-dimensional face model corresponding to the face in the image are obtained on the basis of two-dimensional coordinates of the eyeball center area feature point; and a determination result for the position of a gaze point of the eye of the face in the image is obtained according to two-dimensional coordinates of feature points other than the eyeball center area feature point in the eye feature points and the three-dimensional coordinates of the eyeball center area feature point in the preset three-dimensional coordinate system. In such embodiments, the computer program is downloaded and installed from the network through the communication section 709, and/or is installed from the removable medium 711. The computer program, when being executed by the CPU 701, executes the foregoing functions defined in the methods of the present application.

In one or more optional implementations, the embodiments of the present disclosure also provide a computer program product configured to store computer-readable instructions, where when the instructions are executed, a computer executes the gaze point determination method in any of the possible embodiments.

The computer program product is implemented by means of hardware, software, or a combination thereof. In an optional example, the computer program product is specifically represented by a computer storage medium. In another optional example, the computer program product is represented by a software product, such as a Software Development Kit (SDK).

In one or more optional implementations, the embodiments of the present disclosure further provide a gaze point determination method, an apparatus corresponding thereto, an electronic device, a computer storage medium, a computer program, and a computer program product. The method includes: a first apparatus sends a gaze point determination indication to a second apparatus, where the indication causes the second apparatus to execute the gaze point determination method according to any one of the possible embodiments; and the first apparatus receives an gaze point determination result sent by the second apparatus.

In some embodiments, the gaze point determination indication is specified as an invocation instruction. The first apparatus instructs, by means of invocation, the second apparatus to execute gaze point determination. Accordingly, in response to the reception of the invocation instruction, the second apparatus performs the steps and/or processes in any one of the embodiments of the gaze point determination method. It should be understood that the terms such as "first" and "second" in the embodiments of the present disclosure are only used for distinguishing, and shall not be understood as limitations on the embodiments of the present disclosure.

It should also be understood that, in the present disclosure, "multiple" may refer to two or more, and "at least one" may refer to one, two or more.

It should also be understood that, for any component, data or structure mentioned in the present disclosure, if there is no explicit limitation or no opposite motivation is provided in context, it is generally understood that the number of the component, data or structure is one or more.

It should be further understood that the description of each embodiment of the present disclosure emphasizes differences between the embodiments, and the same or similar points therebetween may be used as reference and omitted for clarity.

The methods and apparatuses of the present disclosure may be implemented in many manners. For example, the methods and apparatuses of the present disclosure may be implemented with software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for executing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A gaze point determination method, comprising:
obtaining two-dimensional coordinates of eye feature points of at least one eye of a face in an image, wherein the eye feature points comprise an eyeball center area feature point;
obtaining, in a preset three-dimensional coordinate system, a three-dimensional coordinate of a corresponding eyeball center area feature point in a three-dimensional face model corresponding to the face in the image based on the obtained two-dimensional coordinate of the eyeball center area feature point; and
obtaining a gaze fraction of the eye of the face in the image according to two-dimensional coordinates of feature points other than the eyeball center area feature point in the eye feature points and the three-dimensional coordinate of the eyeball center area feature point in the preset three-dimensional coordinate system, comparing the gaze fraction with a preset threshold to obtain the determination result for the position of the gaze point of the eye of the face in the image, and obtaining a determination result for a position of a gaze point of an eye of the face in the image,
wherein the comparing the gaze fraction with a preset threshold to obtain the determination result for the position of the gaze point of the eye of the face in the image comprises:
responsive to that the gaze fraction is greater than the preset threshold, determining that the gaze point of the eye of the face in the image is within a preset area; and
responsive to that the gaze fraction is less than or equal to the preset threshold, obtaining that the gaze point of the eye of the face in the image is out of the preset area,
wherein the method further comprises:
displaying the image according to a first preset display mode in response to that the gaze point of the eye of the face in the image is within the preset area; and
displaying the image according to a second preset display mode in response to that the gaze point of the eye of the face in the image is out of the preset area, wherein the first preset display mode and the second preset display mode respectively indicate setting frames of different colors for the image displayed.

2. The method according to claim 1, wherein the eye feature points further comprise: an eyelid line feature point and an eyeball contour feature point.

3. The method according to claim 1, wherein the obtaining two-dimensional coordinates of eye feature points of at least one eye of a face in an image comprises:
extracting features from the image, and obtaining two-dimensional coordinates of face feature points in the image; and
obtaining the two-dimensional coordinates of the eye feature points of at least one eye of the face in the image based on the two-dimensional coordinates of the face feature points in the image.

4. The method according to claim 3, wherein the obtaining the two-dimensional coordinates of the eye feature points of at least one eye of the face in the image based on the two-dimensional coordinates of the face feature points in the image comprises:
intercepting one or more rectangular images comprising an eye area corresponding to the at least one eye from the image according to two-dimensional coordinates of feature points of eye area of the face in the image; and
extracting features from the rectangular image, and obtaining the two-dimensional coordinates of the eye feature points of at least one eye of the face in the image.

5. The method according to claim 4, wherein the intercepting rectangular images comprising an eye area corresponding to the at least one eye from the image according to two-dimensional coordinates of feature points of the eye area of the face in the image comprises:
intercepting a rectangular image comprising an eye area corresponding to one eye from the image according to two-dimensional coordinates of feature points of the eye area of one eye of the face in the image; and
the extracting features from the rectangular image, and obtaining the two-dimensional coordinates of the eye feature points of at least one eye of the face in the image comprises:
extracting features from the rectangular image, and obtaining the two-dimensional coordinates of the eye feature points of one eye of the face in the image;
or,
mirroring the rectangular image, extracting features from the rectangular image and the mirrored rectangular image, and obtaining the two-dimensional coordinates of the eye feature points of two eyes of the face in the image.

6. The method according to claim 1, wherein the preset area comprises: part or all of a screen area.

7. The method according to claim 1, wherein the obtaining a gaze fraction of the eye of the face in the image according to the two-dimensional coordinates of the feature points other than the eyeball center area feature point in the eye feature points and the three-dimensional coordinate of the eyeball center area feature point in the preset three-dimensional coordinate system comprises:
obtaining, through a neural network, the gaze fraction of the eye of the face in the image according to the two-dimensional coordinates of the feature points other than the eyeball center area feature point in the eye feature points and the three-dimensional coordinate of the eyeball center area feature point in the preset three-dimensional coordinate system.

8. The method according to claim 7, wherein after the obtaining, in the preset three-dimensional coordinate system, the three-dimensional coordinate of an eyeball center area feature point in a three-dimensional face model corresponding to the face in the image based on the obtained two-dimensional coordinate of the eyeball center area feature point, the method further comprises:
adjusting, according to a preset format, formats of the two-dimensional coordinates of the feature points other than the eyeball center area feature point in the eye feature points and the three-dimensional coordinate of the eyeball center area feature point in the preset three-dimensional coordinate system; and
the obtaining, through a neural network, the gaze fraction of the eye of the face in the image according to the two-dimensional coordinates of the feature points other than the eyeball center area feature point in the eye feature points and the three-dimensional coordinate of the eyeball center area feature point in the preset three-dimensional coordinate system comprises:
obtaining, through the neural network, the gaze fraction of the eye of the face in the image according to the two-dimensional coordinates of the feature points other than the eyeball center area feature point in the eye feature points and the three-dimensional coordinate of the eyeball center area feature point in the preset three-dimensional coordinate system which are subjected to format adjustment.

9. The method according to claim 1, wherein the method is applied to at least one of the following: facial expression recognition, terminal payment, terminal locking, or terminal unlocking.

10. The method according to claim 1, wherein the obtaining, in the preset three-dimensional coordinate system, the three-dimensional coordinate of a corresponding eyeball center area feature point in a three-dimensional face model corresponding to the face in the image based on the obtained two-dimensional coordinate of the eyeball center area feature point comprises:
generating the three-dimensional face model corresponding to the face in the image according to the face in the image; and
obtaining, in the preset three-dimensional coordinate system, the three-dimensional coordinate of the corresponding eyeball center area feature point in the three-dimensional face model based on the obtained two-dimensional coordinate of the eyeball center area feature point.

11. The method according to claim 1, wherein the preset threshold comprises: a difference between a true positive rate and a false positive rate, the true positive rate comprising: a rate of correct determination when the gaze point of the eye of the face in the image is within the preset area, and the false positive rate comprising: a rate of incorrect determination when the gaze point of the eye of the face in the image is out of the preset area.

12. The method according to claim 10, wherein the generating the three-dimensional face model corresponding to the face in the image according to the face in the image comprises:
generating the three-dimensional face model corresponding to the face according to a correspondence between keypoints of the face in the image and keypoints of a prior three-dimensional face model.

13. A gaze point determination apparatus, comprising:
a processor; and
a memory for storing instructions executable by the processor,
wherein the processor is configured to:
obtain two-dimensional coordinates of eye feature points of at least one eye of a face in an image, wherein the eye feature points comprise an eyeball center area feature point; and obtain, in the preset three-dimensional coordinate system, a three-dimensional coordinate of a corresponding eyeball center area feature point in a three-dimensional face model corresponding to the face in the image based on the obtained two-dimensional coordinate of the eyeball center area feature point; and
obtain a gaze fraction of the eye of the face in the image according to two-dimensional coordinates of feature points other than the eyeball center area feature point in the eye feature points and the three-dimensional coordinate of the eyeball center area feature point in the preset three-dimensional coordinate system, compare the gaze fraction with a preset threshold to obtain the determination result for the position of the gaze point of the eye of the face in the image, and obtain a determination result for a position of a gaze point of an eye of the face in the image,
wherein the operation of comparing the gaze fraction with a preset threshold to obtain the determination result for the position of the gaze point of the eye of the face in the image comprises:
responsive to that the gaze fraction is greater than the preset threshold, determining that the gaze point of the eye of the face in the image is within a preset area; and
responsive to that the gaze fraction is less than or equal to the preset threshold, obtaining that the gaze point of the eye of the face in the image is out of the preset area,
wherein the processor is further configured to:
display the image according to a first preset display mode in response to that the gaze point of the eye of the face in the image is within the preset area; and
display the image according to a second preset display mode in response to that the gaze point of the eye of the face in the image is out of the preset area, wherein the first preset display mode and the second preset display mode respectively indicate setting frames of different colors for the image displayed.

14. The apparatus according to claim 13, wherein the eye feature points further comprise: an eyelid line feature point and an eyeball contour feature point, and
the processor is configured to:
extract features from the image, and obtain two-dimensional coordinates of face feature points in the image; and
obtain the two-dimensional coordinates of the eye feature points of at least one eye of the face in the image based on the two-dimensional coordinates of the face feature points in the image.

15. The apparatus according to claim 13, wherein the processor is configured to:
generate the three-dimensional face model corresponding to the face in the image according to the face in the image; and
obtain, in the preset three-dimensional coordinate system, the three-dimensional coordinate of the corresponding eyeball center area feature point in the three-dimensional face model based on the obtained two-dimensional coordinate of the eyeball center area feature point.

16. The apparatus according to claim 13, wherein the preset threshold comprises: a difference between a true positive rate and a false positive rate, the true positive rate comprising: a rate of correct determination when the gaze point of the eye of the face in the image is within the preset area, and the false positive rate comprising: a rate of incorrect determination when the gaze point of the eye of the face in the image is out of the preset area.

17. A non-transitory computer storage medium, having stored therein computer-readable instructions that, when being executed by a processor, cause the processor to implement the operations of:

obtaining two-dimensional coordinates of eye feature points of at least one eye of a face in an image, wherein the eye feature points comprise an eyeball center area feature point;

obtaining, in a preset three-dimensional coordinate system, a three-dimensional coordinate of a corresponding eyeball center area feature point in a three-dimensional face model corresponding to the face in the image based on the obtained two-dimensional coordinate of the eyeball center area feature point; and obtaining a gaze fraction of the eye of the face in the image according to two-dimensional coordinates of feature points other than the eyeball center area feature point in the eye feature points and the three-dimensional coordinate of the eyeball center area feature point in the preset three-dimensional coordinate system, comparing the gaze fraction with a preset threshold to obtain the determination result for the position of the gaze point of the eye of the face in the image, and obtaining a determination result for a position of a gaze point of an eye of the face in the image, wherein the operation of comparing the gaze fraction with a preset threshold to obtain the determination result for the position of the gaze point of the eye of the face in the image comprises:

responsive to that the gaze fraction is greater than the preset threshold, determining that the gaze point of the eye of the face in the image is within a preset area; and responsive to that the gaze fraction is less than or equal to the preset threshold, obtaining that the gaze point of the eye of the face in the image is out of the preset area, wherein the operations further comprise:

displaying the image according to a first preset display mode in response to that the gaze point of the eye of the face in the image is within the preset area; and displaying the image according to a second preset display mode in response to that the gaze point of the eye of the face in the image is out of the preset area, wherein the first preset display mode and the second preset display mode respectively indicate setting frames of different colors for the image displayed.

* * * * *